United States Patent
Levin et al.

(10) Patent No.: US 11,384,740 B2
(45) Date of Patent: Jul. 12, 2022

(54) SYSTEM AND METHOD FOR LOCKING OF A ROTOR OF A WIND TURBINE DURING EXTENDED MAINTENANCE

(71) Applicant: General Electric Company, Schenectady, NY (US)

(72) Inventors: Jennifer Ann Levin, New Orleans, LA (US); Arun Eapen Mathew, Bangalore (IN); Rajasekhar Koppolu, Bangalore (IN); Renlong Ying, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/068,975

(22) Filed: Oct. 13, 2020

(65) Prior Publication Data

US 2021/0108620 A1   Apr. 15, 2021

(30) Foreign Application Priority Data

Oct. 15, 2019   (CN) .......................... 201910978341.9

(51) Int. Cl.
  *F03D 80/50*   (2016.01)
  *F03D 80/70*   (2016.01)
  *F03D 7/02*   (2006.01)

(52) U.S. Cl.
  CPC ........... *F03D 80/50* (2016.05); *F03D 7/0268* (2013.01); *F03D 80/70* (2016.05); *F05B 2240/21* (2013.01); *F05B 2240/50* (2013.01); *F05B 2260/31* (2020.08)

(58) Field of Classification Search
  CPC .... F03D 7/0248; F03D 7/0244; F03D 7/0268; F03D 13/10; F03D 80/50; F05B 2260/31; F05B 2260/301; F05B 2260/902
  See application file for complete search history.

(56) References Cited

U.S. PATENT DOCUMENTS

| | | |
|---|---|---|
| 4,966,525 A | 10/1990 | Nielsen |
| 6,774,504 B1 | 8/2004 | Lagerwey |
| 6,833,632 B2 | 12/2004 | Becker et al. |
| 7,165,941 B2 | 1/2007 | Wobben |
| 7,353,603 B2 | 4/2008 | Wobben |
| 7,360,310 B2 | 4/2008 | Bagepalli et al. |
| 7,397,145 B2 | 7/2008 | Struve et al. |

(Continued)

FOREIGN PATENT DOCUMENTS

| | | |
|---|---|---|
| CN | 201568228 U | 9/2010 |
| CN | 202300839 U | 7/2012 |

(Continued)

OTHER PUBLICATIONS

European Search Report for EP Application No. 20202056.6, dated Mar. 6, 2021.

*Primary Examiner* — David E Sosnowski
*Assistant Examiner* — Maxime M Adjagbe
(74) *Attorney, Agent, or Firm* — Dority & Manning, P.A.

(57) ABSTRACT

A rotor lock assembly for locking a rotor of a wind turbine includes at least one removable rotor lock. The removable rotor lock has a housing comprising an opening and a mounting portion, a pin shaft positioned within the opening, and a locking mechanism. The opening extends from a first end to a second end thereof. The mounting portion is adapted for mounting to a bearing housing adjacent to a rotor lock plate of the rotor.

17 Claims, 8 Drawing Sheets

(56) References Cited

U.S. PATENT DOCUMENTS

| | | |
|---|---|---|
| 7,431,567 B1 | 10/2008 | Bevington et al. |
| 7,721,434 B2 | 5/2010 | Weaver et al. |
| 7,948,100 B2 | 5/2011 | Nies et al. |
| 7,958,797 B2 | 6/2011 | Aust et al. |
| 8,028,604 B2 | 10/2011 | Moore et al. |
| 8,083,212 B2 | 12/2011 | Numajiri et al. |
| 8,096,764 B2 | 1/2012 | Steffensen |
| 8,120,198 B2 | 2/2012 | Pabst et al. |
| 8,167,575 B2 | 5/2012 | Eusterbarkey |
| 8,206,111 B2 | 6/2012 | Aarhus et al. |
| 8,210,810 B2 | 7/2012 | Egoshi et al. |
| 8,246,308 B2 | 8/2012 | Numajiri |
| 8,319,363 B2 | 11/2012 | Song et al. |
| 8,334,608 B2 | 12/2012 | Pechlivanoglou et al. |
| 8,508,064 B2 | 8/2013 | Lauke |
| 8,556,591 B2 * | 10/2013 | Koronkiewicz ........ F03D 80/70 416/244 R |
| 8,624,412 B2 | 1/2014 | Siegriedsen |
| 8,646,177 B2 | 2/2014 | Tirumalai et al. |
| 8,669,685 B2 | 3/2014 | Casazza et al. |
| 8,696,302 B2 | 4/2014 | Stiesdal |
| 8,702,389 B2 | 4/2014 | Wedekind et al. |
| 8,740,566 B2 | 6/2014 | Eriksen et al. |
| 8,851,309 B2 | 10/2014 | Pedersen |
| 8,936,437 B2 | 1/2015 | Holling et al. |
| 8,944,766 B2 | 2/2015 | Nielsen et al. |
| 8,975,770 B2 | 3/2015 | Gelmini |
| 8,997,350 B2 | 4/2015 | Trede et al. |
| 9,228,567 B2 | 1/2016 | Bitsch et al. |
| 9,281,731 B2 | 3/2016 | Benedict |
| 9,318,925 B2 | 4/2016 | Lemma |
| 9,470,208 B2 | 10/2016 | Nies |
| 9,476,396 B2 | 10/2016 | Fritzsche et al. |
| 9,512,723 B2 | 12/2016 | Muller |
| 9,757,821 B2 | 9/2017 | Thomas et al. |
| 9,777,710 B2 | 10/2017 | Muik |
| 9,906,099 B2 | 2/2018 | Eriksen et al. |
| 9,926,909 B2 | 3/2018 | Cortada Acosta et al. |
| 2005/0212300 A1 | 9/2005 | Kimura et al. |
| 2012/0091724 A1 | 4/2012 | Bodenstein et al. |
| 2012/0131786 A1 | 5/2012 | Neumann |
| 2012/0134818 A1 | 5/2012 | Sato et al. |
| 2013/0259688 A1 | 10/2013 | Sorensen |
| 2014/0010656 A1 | 1/2014 | Nies |
| 2015/0096174 A1 | 4/2015 | Lohan et al. |
| 2015/0219073 A1 | 8/2015 | Baumgaertel |
| 2016/0245258 A1 | 8/2016 | Firkser et al. |
| 2017/0288500 A1 | 10/2017 | Eriksen et al. |
| 2017/0288501 A1 | 10/2017 | Eriksen et al. |
| 2019/0072078 A1 * | 3/2019 | Munk-Hansen ........ F03D 80/82 |
| 2019/0277254 A1 * | 9/2019 | Larsen ................. F03D 7/0244 |

FOREIGN PATENT DOCUMENTS

| | | |
|---|---|---|
| CN | 103016277 A | 4/2013 |
| CN | 105386941 A | 3/2016 |
| DE | 102004017323 A1 | 11/2005 |
| DE | 102004028746 A1 | 12/2005 |
| DE | 102008031484 B4 | 7/2010 |
| DE | 102015119311 B3 | 12/2016 |
| EP | 1291521 A1 | 3/2003 |
| EP | 1617075 B1 | 12/2008 |
| EP | 2573036 A2 | 3/2013 |
| EP | 2905467 B1 | 8/2015 |
| EP | 1167755 B1 | 12/2015 |
| EP | 1167754 B1 | 8/2016 |
| JP | 2002130109 A | 5/2002 |
| JP | 2004028003 A | 1/2004 |
| JP | 2004124771 A | 4/2004 |
| JP | 4461078 B2 | 5/2010 |
| JP | 4953395 B2 | 6/2012 |
| KR | 100821704 B1 | 4/2008 |
| KR | 20090072412 A | 7/2009 |
| KR | 20110007947 U | 8/2011 |
| KR | 101215509 B1 | 12/2012 |
| KR | 101271186 B1 | 6/2013 |
| KR | 101323801 B1 | 10/2013 |
| KR | 101346177 B1 | 12/2013 |
| KR | 101379727 B1 | 3/2014 |
| KR | 20140038614 A | 3/2014 |
| KR | 101387749 B1 | 4/2014 |
| KR | 101397452 B1 | 5/2014 |
| KR | 101400150 B1 | 5/2014 |
| KR | 101400205 B1 | 5/2014 |
| KR | 20140085000 A | 7/2014 |
| KR | 101487509 B1 | 1/2015 |
| KR | 101508624 B1 | 4/2015 |
| KR | 20150045195 A | 4/2015 |
| KR | 20160074989 A | 6/2016 |
| KR | 101638008 B1 | 7/2016 |
| WO | WO2010102967 A2 | 9/2010 |
| WO | WO2013032112 A1 | 3/2013 |
| WO | WO2014161627 A1 | 10/2014 |
| WO | WO-2018036595 A1 * | 3/2018 ........... F03D 7/0268 |

\* cited by examiner

SYSTEM AND METHOD FOR LOCKING OF A ROTOR OF A WIND TURBINE DURING EXTENDED MAINTENANCE

FIELD

The present disclosure relates in general to wind turbines, and more particularly to systems and methods for locking a rotor of a wind turbine during extended maintenance operations.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. More specifically, in many wind turbines, the gearbox is mounted to the bedplate via one or more torque arms or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

More specifically, the majority of commercially available wind turbines utilize multi-stage geared drivetrains to connect the turbine blades to electrical generators. The wind turns the rotor blades, which spin a low speed shaft, i.e. the main shaft. The main shaft is coupled to an input shaft of the gearbox, which has a higher speed output shaft connected to the generator. Thus, the geared drivetrain aims to increase the velocity of the mechanical motion. Further, the gearbox and the generator are typically supported by one or more bearings and mounted to a bedplate member via one or more torque arms or supports.

During the lifecycle of the wind turbine, it may, from time to time, be necessary to perform maintenance operations on the various components of the wind turbine. Typically, such maintenance cannot be performed on a wind turbine if the rotor is able to rotate in response to a wind load. As such, maintenance operations will often require the securing of the rotor in a fixed position. Typically, the rotation of the rotor may initially be stopped by a combination of brakes applied to the rotor shaft and pitching of the rotor blades. The rotor may be secured in place through the use of a low-speed rotor lock, which is typically an integral component of the wind turbine.

Generally, the low-speed rotor lock is designed to withstand an anticipated load of the rotor in response to winds up to a certain threshold. As such, the low-speed rotor lock may, generally, only be employed for such a length of time as it is possible to predict, with a reasonable degree of certainty, that the winds will not exceed the threshold. Such a time period is usually limited to a few hours. However, certain maintenance procedures cannot be accomplished within this time frame.

In view of the aforementioned, the art is continuously seeking new and improved systems and methods for securing the rotor in a fixed position at the greater wind speeds that may be encountered during an extended maintenance window.

BRIEF DESCRIPTION

Aspects and advantages of the invention will be set forth in part in the following description, or may be obvious from the description, or may be learned through practice of the invention.

In one aspect, the present disclosure is directed to a rotor lock assembly for locking a rotor of a wind turbine. The rotor lock assembly may include at least one removable rotor lock. The removable rotor lock(s) may include a housing including an opening and a mounting portion. The opening may extend from a first end to a second end thereof. The mounting portion may be adapted for mounting to a bearing housing adjacent to a rotor lock plate of the rotor. The removable rotor(s) may include a pin shaft positioned within the opening. The pin shaft may include a proximal end and a distal end. The pin shaft may be movable within the opening such that the distal end moves toward and engages the rotor lock plate of the rotor. The removable rotor lock(s) may also include a locking mechanism for locking the pin shaft in place.

In an embodiment, the rotor lock assembly may also include a plurality of fasteners for securing the mounting portion of the housing to the bearing housing through a plurality of fastener openings of the mounting portion. Additionally, in an embodiment, the pin shaft may engage the rotor lock plate via a through hole configured therethrough. The through hole may define an axis parallel to and offset from a main shaft of the rotor. In another embodiment, the rotor lock assembly may also include an alignment system operably coupled to the pin shaft so as to align the pin shaft with the through hole of the rotor lock plate.

In an embodiment, the removable rotor lock(s) may include a first removable rotor lock and a second removable rotor lock. The first removable rotor lock may be coupled to a first quadrant of the bearing housing, and the second removable rotor lock may be coupled to a second, adjacent quadrant of the bearing housing. In an additional embodiment, the housing may include a bushing element positioned within the opening and a bushing securing mechanism oriented to engage a corresponding feature of the bushing element and secure the bushing element within the opening.

In an additional embodiment, the pin shaft may be movable within the bushing element via at least one of an axial movement or a rotational movement. The pin shaft may be moved by at least one of a direct-manual engagement system, a hydraulic engagement system, a geared engagement system, or a motorized engagement system operably coupled to the pin shaft. In an additional embodiment, the proximal end of the pin shaft engages the locking mechanism.

In an embodiment, the distal end of the pin shaft may include a tapered cross-sectional profile. In another embodiment, the housing may also include at least one attachment location for providing a lifting point for lifting the rotor lock assembly uptower.

In another aspect, the present disclosure is directed to a method for performing a maintenance and/or repair procedure on a rotor component of a wind turbine. The method may include coupling the removable rotor lock(s) to a main bearing housing. The method may include preventing rotation of the rotor and advancing an integral low-speed rotor lock of the wind turbine so as to engage a first corresponding feature of the rotor lock plate. The method may include advancing a pin shaft of the at least one removable rotor lock to an advanced position so as to engage a second corresponding feature of the rotor lock plate. The method may also include securing the pin shaft in the advanced position through the engagement of the locking mechanism.

In one embodiment, the method for performing a maintenance and/or repair procedure on a rotor component of a wind turbine may also include aligning the pin shaft with the corresponding feature of the rotor lock plate via an alignment system operably coupled to the pin shaft. In an embodiment, advancing the pin shaft may include advancing the pin shaft via at least one of a direct-manual engagement system, a hydraulic engagement system, a geared engagement system, or a motorized engagement system operably coupled to the pin shaft.

In an embodiment, the method may include coupling first and second rotor lock(s) to a first quadrant of the bearing housing and an adjacent, second quadrant of the main bearing housing, respectively. In an embodiment the method may also include performing the maintenance procedure on an assembled nacelle, uptower. In a further embodiment, the method may include hoisting the first and second removable rotor locks through an access hatch located on an underside of the nacelle up tower.

In another aspect, the present disclosure is directed to a wind turbine repair system. The wind turbine repair system may include a rotor lock plate circumferentially mounted to a rotor shaft of the wind turbine. The rotor lock plate may define a plurality of openings, which have an axis parallel to and offset from the rotor shaft. The wind turbine repair system may include a low-speed rotor lock coupled to a bedplate support frame perpendicular to the rotor lock plate, a bearing housing, and at least one removable rotor lock mounted to the bearing housing. The removable rotor lock may include a housing having an opening and a mounting portion. The opening may extend from a first end to a second end thereof. The mounting portion may be adapted for mounting to a bearing housing adjacent to a rotor lock plate of the rotor. The removable rotor lock may also include a pin shaft positioned within the opening. The pin shaft may include a proximal end and a distal end. The pin shaft may be movable within the opening such that the distal end moves toward and engages the rotor lock plate of the rotor. The removable rotor lock may also include a locking mechanism for locking the pin shaft in place.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
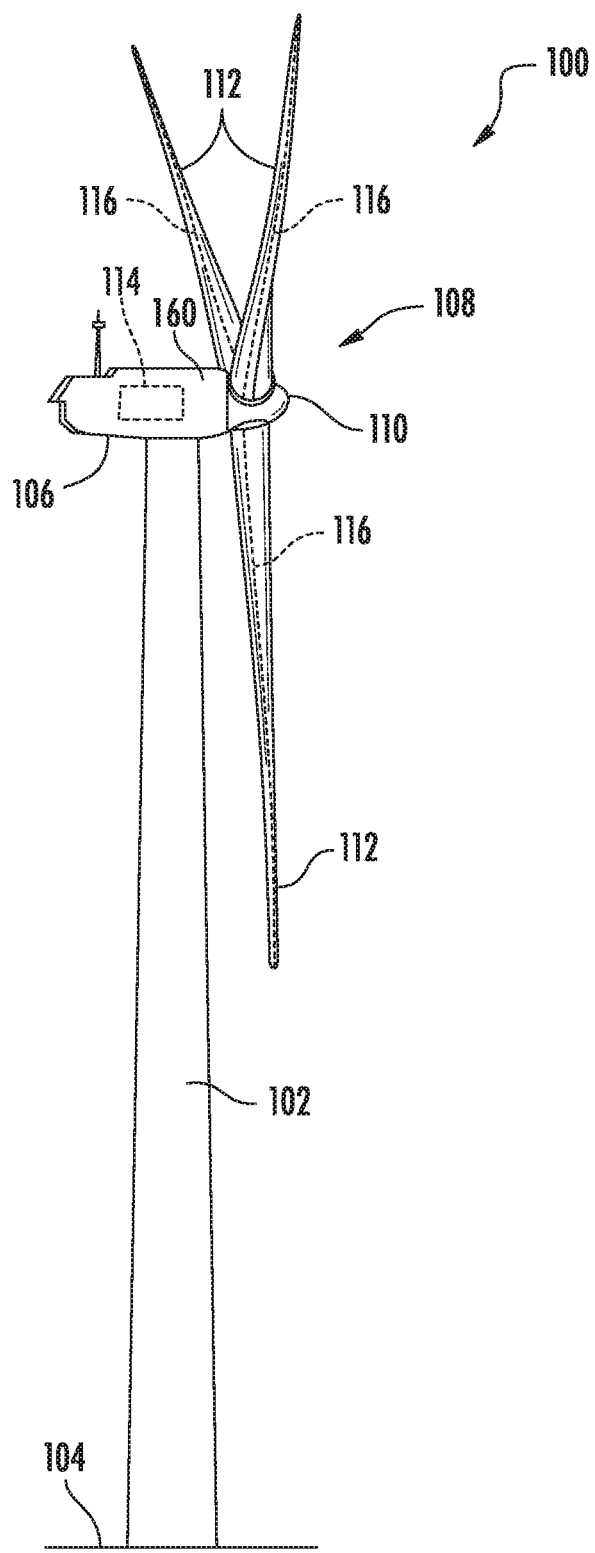
FIG. 1 illustrates a perspective view of one embodiment of a wind turbine according to aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a rotor lock assembly for locking a rotor of a wind turbine during an extended maintenance operation. The rotor lock assembly includes a removable rotor lock(s). The removable rotor lock(s) includes may a housing, a bushing element, a pin shaft, and a locking mechanism. The housing has an opening extending from a first end to a second end and a mounting portion. The mounting portion is adapted or formed for mounting to a corresponding attachment location on the outer surface of the main bearing housing, which is adjacent to a rotor lock plate of the rotor. The bushing element is positioned within the opening of the housing and the pin shaft is positioned within the bushing element. The pin shaft has a proximal end and a distal end. The pin shaft is movable within the bushing element such that a force applied to the pin shaft may cause the pin shaft to move towards and engage the rotor lock plate of the rotor. The pin shaft may be locked in this engaged position by an attached locking mechanism. The removable rotor lock(s) may be sized so as to share a working load with an integral low-speed rotor lock which is coupled to a bedplate support frame. The shared working load of the removable rotor lock(s) and the low-speed rotor lock may be sufficient to withstand the forces generated by a wind in excess of the forecasted a speed during an extended maintenance period.

Generally, a maintenance and/or repair procedure may be performed on a component of the wind turbine by coupling the removable rotor lock(s) to the main bearing housing of the wind turbine. The rotation of the rotor, in response to the force of the wind, may be stopped and a built-in, or integral, low-speed rotor lock of the wind turbine may be advanced so as to engage a feature, such as a hole or a depression, of the rotor lock plate. With the rotor in a locked position, the pin shaft of the removable rotor lock(s) may be advanced so as to engage a second feature of the rotor lock plate. The pin shaft may be secured in the advanced position through the engagement of a locking mechanism. With the rotor so secured, an extended maintenance operation may be performed on the wind turbine while the wind turbine is potentially exposed to a broader range of wind speeds.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, which includes an outer shell 160, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The wind turbine 100 may also include a wind turbine controller 114 centralized within the nacelle 106. However, in other embodiments, the controller 114 may be located within any other component of the wind turbine 100 or at a location outside the wind turbine. Further, the controller 114 may be communicatively coupled to any number of the components of the wind turbine 100 in order to control the components. As such, the controller 114 may include a computer or other suitable processing unit. Thus, in several embodiments, the controller 114 may include suitable computer-readable instructions that, when implemented, configure the controller 114 to perform various different functions, such as receiving, transmitting and/or executing wind turbine control signals.

Figure 2:
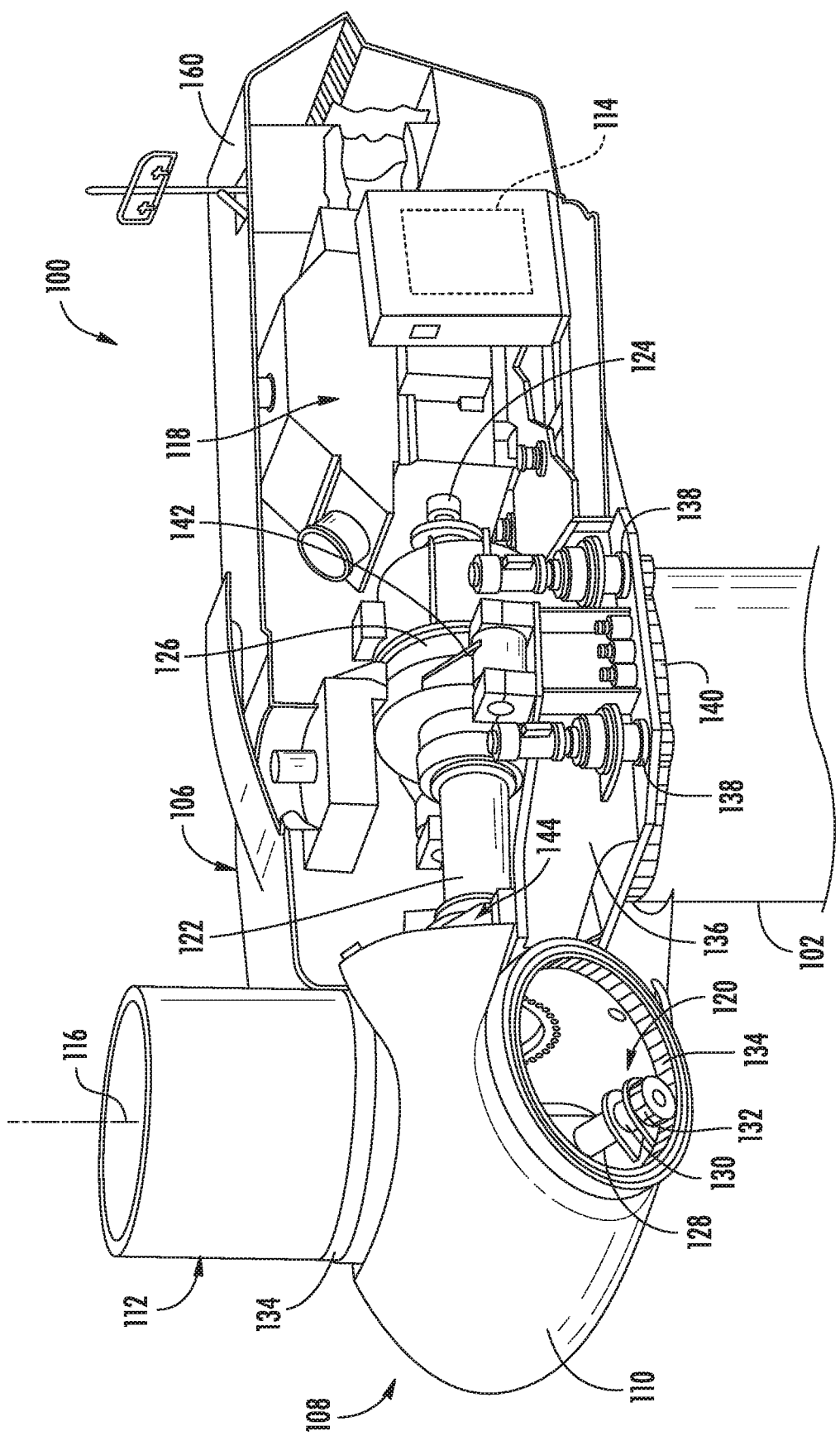
FIG. 2 illustrates a perspective view of one embodiment of a simplified, internal view of one embodiment of a nacelle of a wind turbine according to aspects of the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a generator shaft 124 of the generator 118 through a gearbox 126 connected to a bedplate support frame 136 by one or more torque arms 142. As is generally understood, the rotor shaft 122 may provide a low speed, high torque input to the gearbox 126 in response to rotation of the rotor blades 112 and the hub 110. The gearbox 122 may then be configured to convert the low speed, high torque input to a high speed, low torque output to drive the generator shaft 124 and, thus, the generator 118.

Each rotor blade 112 may also include a pitch adjustment mechanism 120 configured to rotate each rotor blade 112 about its pitch axis 116. Further, each pitch adjustment mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade 112 about the pitch axis 116. Similarly, the wind turbine 100 may include one or more yaw drive mechanisms 138 communicatively coupled to the controller 114, with each yaw drive mechanism(s) 138 being configured to change the angle of the nacelle 106 relative to the wind (e.g., by engaging a yaw bearing 140 of the wind turbine 100).

Figure 3:
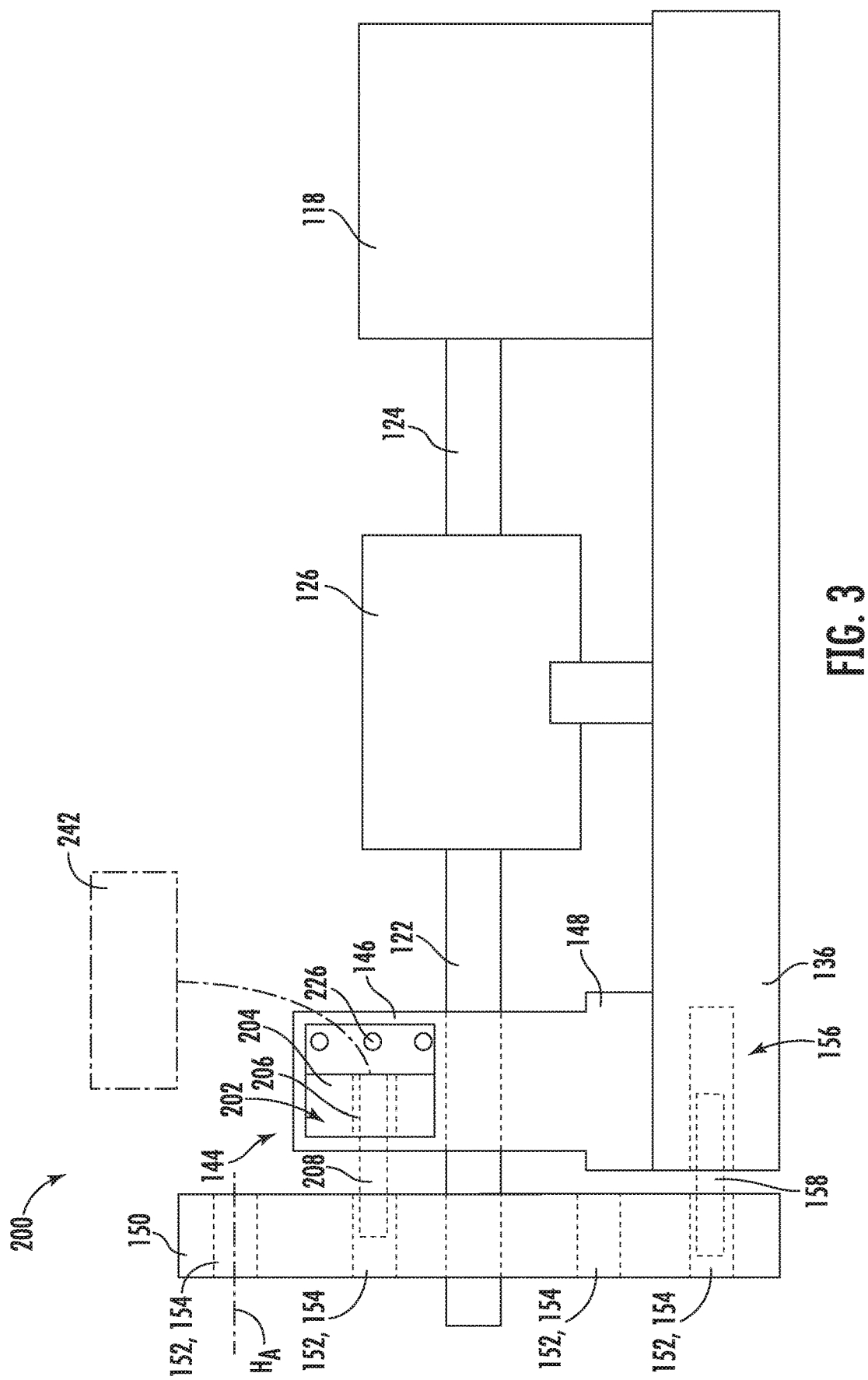
FIG. 3 illustrates a simplified side view of a rotor lock assembly according to aspects of the present disclosure.
Figure 4:
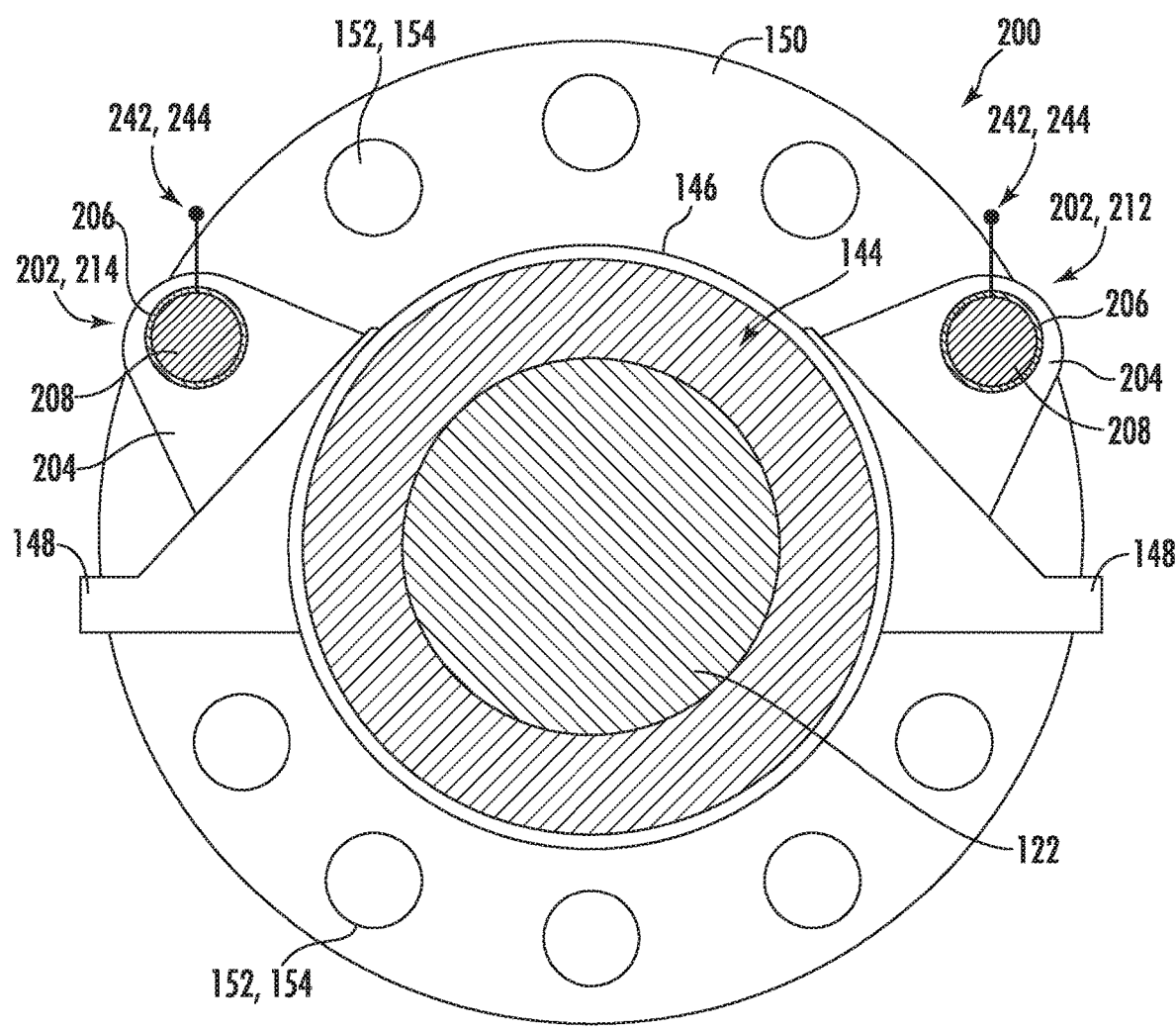
FIG. 4 illustrates a simplified rear view of a rotor lock assembly according to aspects of the present disclosure.

As depicted in FIGS. 3 and 4, the main bearing 144 may generally correspond to a tapered roller bearing but may be any suitable bearing, including for example, a spherical roller bearing, a ball bearing, or any other suitable bearing. In addition, as shown, the main bearing 144 may be secured in place via a bearing housing 146. The main bearing 144 may also be mounted to the bedplate support member 136 of the nacelle 106 via one or more torque supports 148.

Referring still to FIG. 4, in an embodiment, the wind turbine 100 may be outfitted with a rotor lock plate 150. The rotor lock plate 150 may encircle the rotor shaft 122 of the wind turbine 100. The rotor lock plate 150 may include a plurality of features 152 which may be engaged in order to secure the rotor 108 and prevent rotation of the rotor 108 in response to a wind load. In an embodiment, the features 152 may be a plurality of through holes 154 defined by the rotor lock plate 150. The through holes 154 may define an axis (HA) parallel to and offset from the main shaft 122 of the rotor 108. It should be appreciated that in an embodiment, the features 152 may, for example, be depressions, grooves, ridges, teeth, or high-friction regions which may be engaged so as to secure the rotor 108.

In an embodiment, such as depicted in FIG. 3, the wind turbine 100 may also be outfitted with a low-speed rotor lock 156. As shown, the low-speed rotor lock 156 may be built into, and be integral with, the bedplate support frame 136. The low-speed rotor lock 156 may include a low-speed rotor lock pin 158 which may be advanced to engage a corresponding feature 152 of the rotor lock plate 150. The low-speed rotor lock 156 may be sized so as to resist a force developed by winds up to a first wind threshold.

Figure 5A:
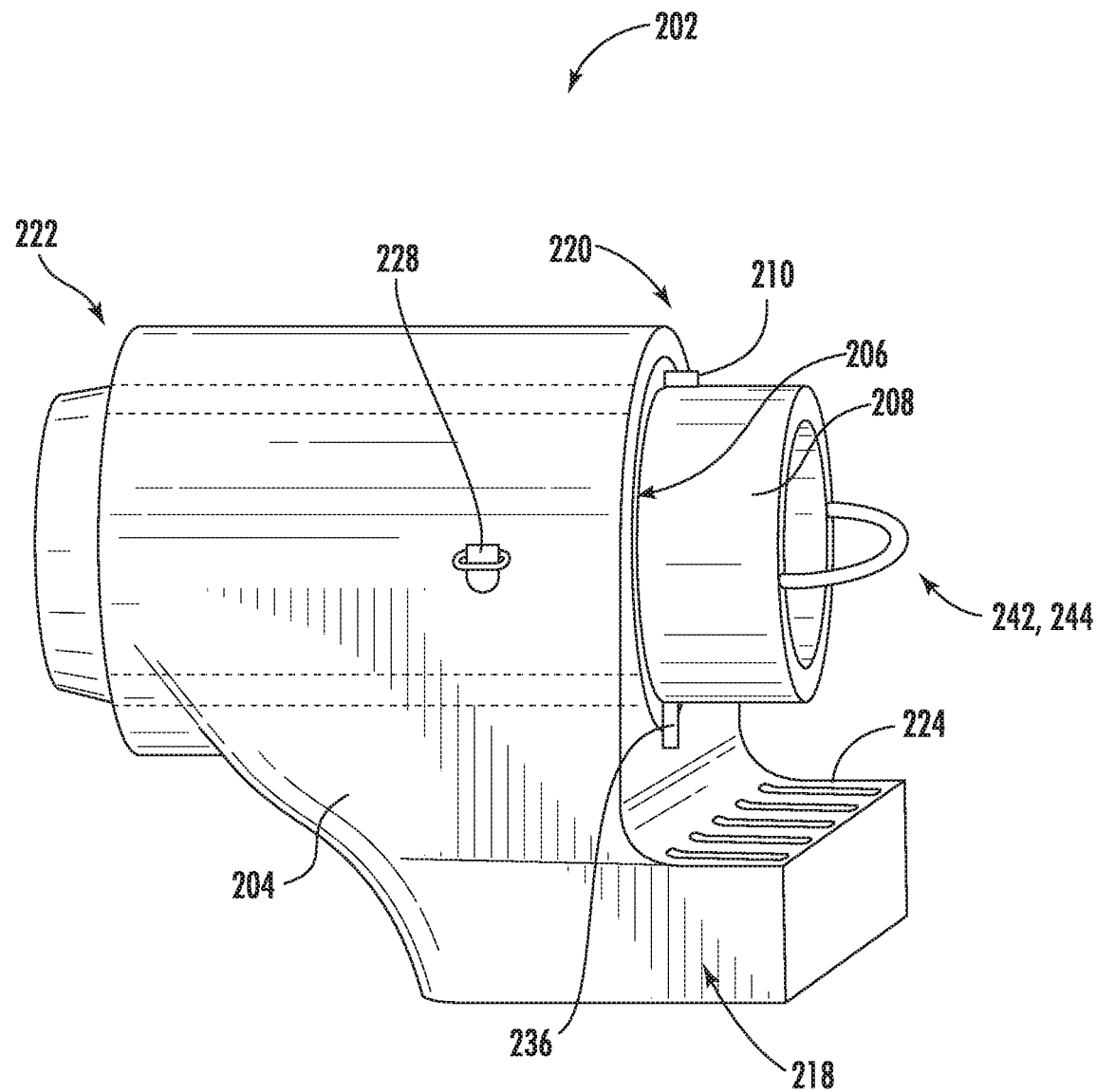
FIG. 5A illustrates a perspective view of a rotor lock according to aspects of the present disclosure.

In FIGS. 3 and 4, side and rear views of a rotor lock assembly 200 in accordance with an embodiment of the present disclosure are illustrated. The rotor lock assembly 200 may lock a rotor 108 of a wind turbine 100 so as to facilitate maintenance operations during a period of time wherein the possibility exists to encounter winds in excess of the first wind threshold. The rotor lock assembly 200 may, in accordance with aspects of the present disclosure, include the removable rotor lock(s) 202. More specifically, as shown, the removable rotor lock(s) 202 may be coupled to a quadrant of the bearing housing 146 adjacent to the rotor lock plate 150. In an embodiment, as shown in FIG. 5A, the removable rotor lock(s) 202 may include a housing 204, a bushing element 206 a pin shaft 208 and a locking mechanism 210. It should be appreciated that in at least one embodiment, each rotor lock 202 may include a single pin shaft 208, with the housing 204 being sized to accommodate the single pin shaft 208 positioned within the bushing element 206.

In an embodiment, such as depicted in FIG. 4, the rotor lock assembly 200 may include at least a first removable rotor lock 212 and a second removable lock 214. The first removable rotor lock 212 may be coupled to a first quadrant of the bearing housing 146. The second removable rotor lock 214 may be coupled to a second quadrant of the bearing housing 146 adjacent to the first quadrant. As such, in an embodiment, the removable rotor locks 202 work in conjunction with the low-speed rotor lock 156 to resist, a wind load, which includes a 15% safety margin.

It should be appreciated that the various rotor locks may be subjected to differing portions of the wind load. For example, in an embodiment, the low-speed rotor lock 156 may be configured to resist up to 50% of the anticipated wind load, while a pair of removable rotor locks may each be configured to resist up to 25% of the anticipated wind load. Alternatively, the low-speed rotor lock 156 may be configured to resist up to 70% of the anticipated wind load, while the first removable rotor lock 212 may be configured to resist up to 20% of the anticipated wind load and the second removable rotor lock 214 may be configured to resist up to 10% of the anticipated wind load.

Figure 5B:
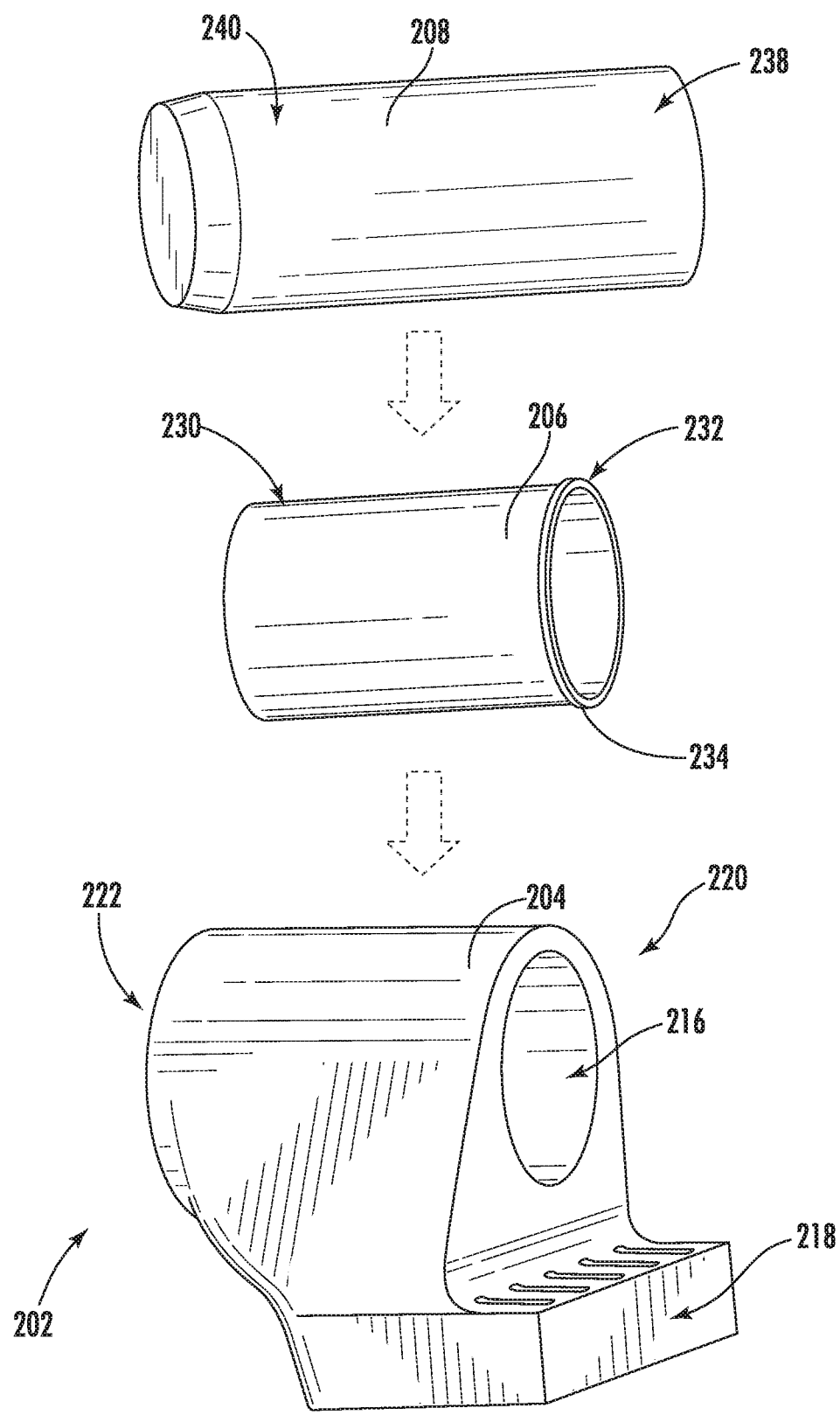
FIG. 5B illustrates an exploded perspective view of the embodiment depicted in FIG. 5A.

FIGS. 5A and 5B illustrate a perspective view and an exploded perspective view of the rotor lock(s) 202 according to aspects of the present disclosure. Further, as shown, the rotor lock(s) 202 may include a housing 204. The housing 204 may include an opening 216. The opening 216 may extend from a first end 220 to a second end 222. The housing 204 may also include a mounting portion 218. The mounting portion 218 may be adapted for mounting to the bearing housing 146 adjacent to the rotor lock plate 150 of the rotor 108. In an embodiment, such as depicted in FIG. 4, the housing 204 may have a rounded-triangular cross-sectional shape wherein the housing radially tapers from a maximal width at the mounting portion 218. The mounting portion 218 may have a surface profile corresponding with a portion of a main bearing housing 146.

In an embodiment, the mounting portion 218 may define a plurality of fastener openings 224. A plurality of fasteners 226 may be inserted through the plurality of fastener openings 224 so as to secure the mounting portion 218, and thus the removable rotor lock(s) 202, to the bearing housing 146. The plurality of fasteners 226 may include screws, bolts, studs and nuts, or removable rivets. It should be appreciated that, in alternative embodiments, the removable rotor lock(s) 202 may be coupled to the bearing housing 146 by any suitable means. For example, the rotor lock(s) 202 may be coupled to the bearing housing by adhering, fusing, welding, or other mechanical means such as a dovetail slot. It should be further appreciated that in an embodiment wherein the fasteners 226 are not employed, the plurality of fastener openings 224 may be omitted from the mounting portion 218.

In an embodiment, such as depicted in FIG. 5A, the housing 204 may be equipped with at least one attachment location 228. The attachment location(s) 228 may be coupled to the housing 204. For example, the attachment location(s) 228 may be a hoist ring, a pad eye, a lifting eye, an eye nut, or an eye bolt. Alternatively, the attachment location(s) 228 may include a protrusion, a recess, or a combination thereof integrally formed with the housing 204.

The attachment location(s) 228 may provide a lifting point for lifting the relocatable rotor lock(s) 202 uptower. The housing 204 may be sized so as to have a lifting footprint which permits the housing 204 to be hoisted through an access hatch located on an underside of nacelle 106 up tower. Additionally, the housing 204 may be sized so as to permit the movement of the housing 204 from the access hatch to the bearing housing 146 without necessitating the removal of the outer shell 160 or the employment of a ground crane. It should be appreciated that multiple rotor locks 202, sized as described herein, may facilitate securing the rotor lock plate 150 with multiple pin shafts 208 in situations where a single housing containing multiple pins may not be emplaced without removing the outer shell 160.

Figure 6:
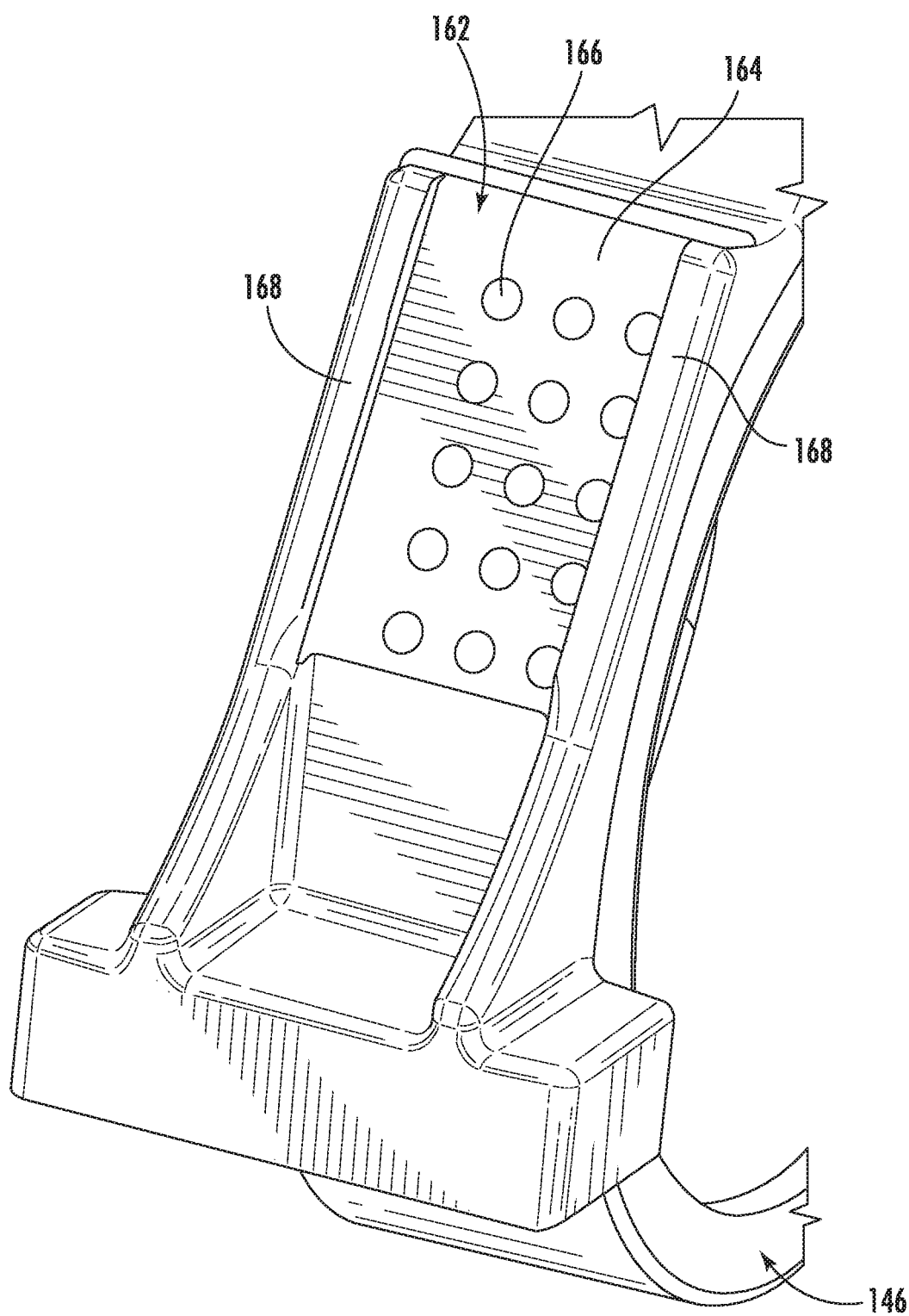
FIG. 6 illustrates a perspective view of a portion of the bearing housing according to aspects of the present disclosure.

Referring now to FIG. 6, a perspective view of a portion of the bearing housing 146 is presented in accordance with aspects of the present disclosure. As depicted in FIG. 6, the bearing housing 146 may include a removable rotor lock mounting point 162. As depicted, the removable rotor lock mounting point 162 may include a planar surface 164 defining a plurality of fastener openings 166. The plurality of fastener openings 166 may be configured to couple the removable rotor lock(s) 202 to mounting point 162 via a plurality of fasteners 226 inserted through a plurality of fastener openings 224 of the mounting portion 218. The planar surface 164 having a long axis oriented perpendicular to the rotor shaft 122. The removable rotor lock mounting point 162, may also include a pair of mounting ridges 168 oriented perpendicular to the rotor shaft 122 with the planar surface 164 disposed between the pair of mounting ridges 168. It should be appreciated that, in an alternative embodiment, the planar surface 164 may be a curved surface formed so as to receive or be received by the mounting portion 218.

Referring again to FIGS. 3-5B, the rotor lock(s) 202 may include the bushing element 206. The bushing element 206 may be positioned within the opening 216. The bushing element 206 may have a first portion 230 which may be inserted into the housing 204. The bushing element 206 may also have a second portion 232, which may extend outward from the opening second end 220. The bushing element 206 may include a securing feature 234. The securing feature 234 may be configured as a protrusion or a recess, which may be engaged by a bushing securing mechanism 236 coupled to the housing 204. The bushing securing mechanism 236 may secure the bushing element 206 within the opening 216 of the housing 204. It should be appreciated that the bushing element 206 may be a unitary body. Alternatively, the bushing element 206 may include multiple segments. For example, the first portion 230 may be a first segment, while the second portion 232 may be second segment. In an additional example, the bushing element 206 may be divided by a vertical plane so as to create a first half and a second half.

Referring still to FIGS. 3-5B, the rotor lock(s) 202 may include the pin shaft 208. The pin shaft 208 may be positioned within the bushing element 206. The pin shaft 208 may include a proximal end 238 and a distal end 240. The pin shaft 208 may be movable within the bushing element 206. Upon the application of a force, the distal end 240 may advance or move toward and engage the rotor lock plate 150 of the rotor 108. In at least one embodiment, the proximal end 238 may be formed with a feature which may be engaged by the locking mechanism 210 coupled to at least one of the bushing element 206 or the housing 204 in order to secure the pin shaft 208 in a forward or engaged position. In at least one embodiment, the locking mechanism 210 may include a lockout-tagout element which may prevent an unauthorized disengagement of the pin shaft 208. It should be appreciated that in at least one embodiment, the engagement of the rotor lock plate 150 may be facilitated by an alignment system operably coupled to the pin shaft 208, which may be configured to align the pin shaft 208 with the through hole 154 of the rotor lock plate 150.

In an embodiment, such as depicted in FIGS. 3-5B, the pin shaft 208 may be movable within the bushing element 206 via at least one of an axial movement or a rotational movement along the axis (HA). The movement of the pin shaft 208 may be motivated by an engagement system 242.

The engagement system 242 may be at least one of a direct-manual engagement system, a hydraulic engagement system, a geared engagement system, or a motorized engagement system, which is operably coupled to the pin shaft 208. For example, as depicted in FIG. 5A, a direct-manual engagement system may involve the direct application, upon an engagement protrusion 244, of a force, by a technician in order to slide the pin shaft 208 in an axial direction. Alternatively, the force applied by the technician may cause the pin shaft 208 and/or the bushing element 206 to rotate in response to a plurality of threads and advance or be retracted. In yet a further embodiment, a tool may be employed to turn a crank, which may be coupled to a gearing system configured to move the pin shaft 208 within the bushing element 206.

In an embodiment, such as depicted in FIG. 5B, the distal end 240 of the pin shaft 208 may be relieved so as to facilitate the insertion and/or extraction of the pin shaft 208 from the rotor lock plate 150. In at least one embodiment, the distal end 240 of the pin shaft 208 may have a tapered cross-sectional profile. The tapered cross-sectional profile of the distal end 240 may include, for example, an ogive, a chamfered, or a rounded cross-sectional profile.

Figure 7:
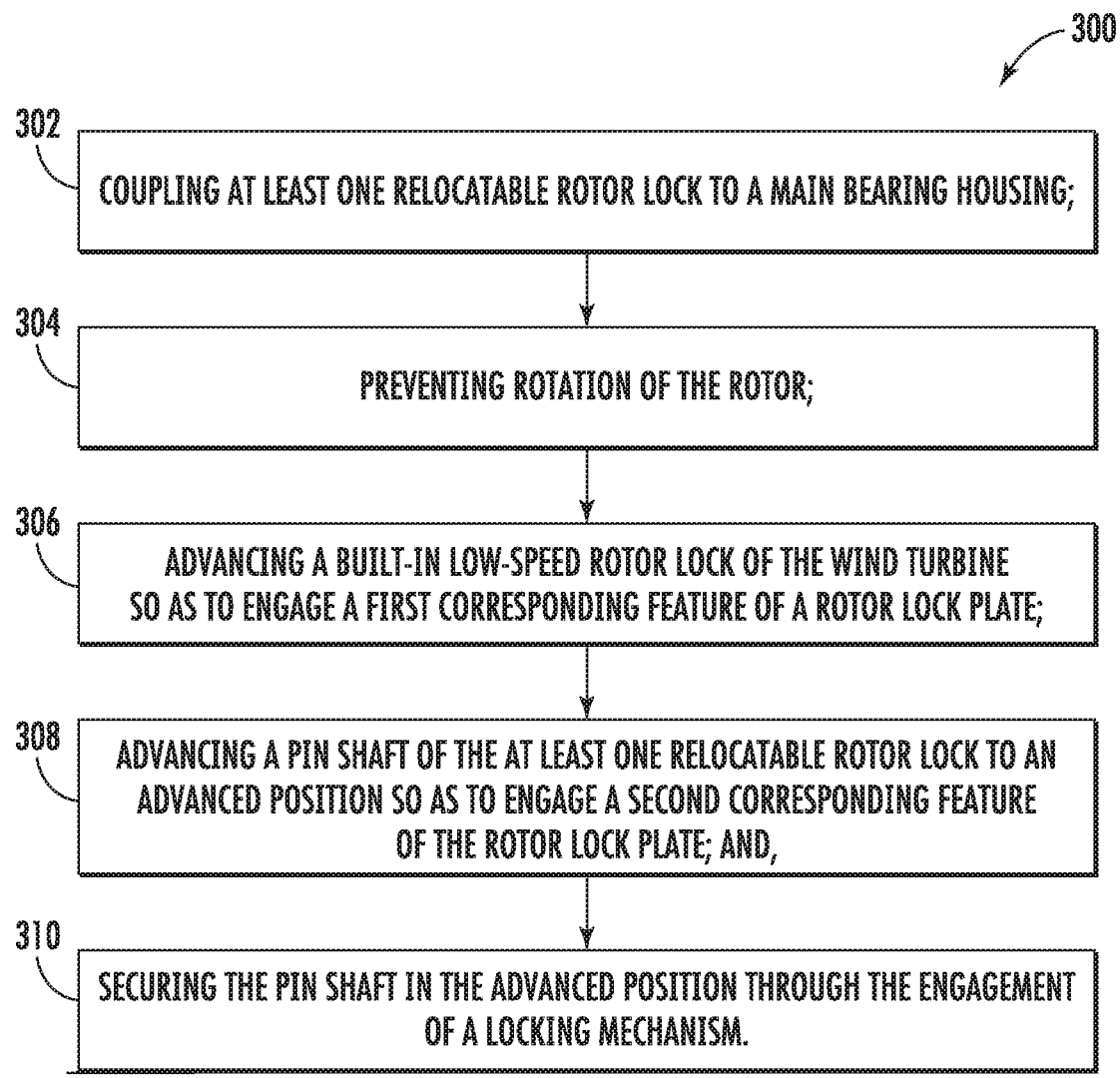
FIG. 7 illustrates a flow diagram of one embodiment of a method for performing a maintenance and/or repair procedure on a rotor component of a wind turbine according to aspects of the present disclosure.

Referring to FIG. 7, a flow diagram of one embodiment of a method 300 for performing a maintenance and/or repair procedure on a component of a wind turbine is illustrated. The method 300 may be implemented using, for instance, the rotor lock assembly 200 discussed above with reference to FIGS. 3-5B. FIG. 6 depicts steps performed in a particular order for purposes of illustration and discussion. Those of ordinary skill in the art, using the disclosures provided herein, will understand that various steps of the method 300 or any of the other methods disclosed herein may be adapted, modified, rearranged, performed simultaneously or modified in various ways without deviating from the scope of the present disclosure.

As shown at (302), the method 300 includes coupling at least one removable rotor lock to a main bearing housing. As shown at (304), the method 300 includes preventing rotation of the rotor, and at (306) advancing a built-in low-speed rotor lock of the wind turbine so as to engage a first corresponding feature of a rotor lock plate. As shown at (308), the method 300 includes advancing a pin shaft of the at least one removable rotor lock to an advanced position so as to engage a second corresponding feature of the rotor lock plate. Additionally, as shown at (310), the method 300 includes securing the pin shaft in the advanced position through the engagement of a locking mechanism.

In additional embodiments, the method (300) may also include aligning the pin shaft with the corresponding feature of the rotor lock plate via an alignment system operably coupled to the pin shaft. Further, advancing the pin shaft may include advancing the pin shaft via an engagement system operably coupled to the pin shaft. In another embodiment, the method (300) may include coupling a second rotor lock to the main bearing housing.

In additional embodiments, the method (300) may include performing the maintenance procedure on an assembled nacelle, up tower. In yet another embodiment, the method (300) may include hoisting the first and second removable rotor locks through an access hatch located on an underside of nacelle up tower.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

For reasons of completeness, various aspects of the present disclosure are set out in the following numbered clauses:

Clause 1. A rotor lock assembly for locking a rotor of a wind turbine, the rotor lock assembly comprising:
at least one removable rotor lock, comprising:
a housing comprising an opening and a mounting portion, the opening extending from a first end to a second end thereof, the mounting portion adapted for mounting to a bearing housing adjacent to a rotor lock plate of the rotor; and,
a pin shaft positioned within the opening, the pin shaft comprising a proximal end and a distal end, the pin shaft being movable within the opening such that the distal end moves toward and engages the rotor lock plate of the rotor; and,
a locking mechanism for locking the pin shaft in place.

Clause 2. The rotor lock assembly of clause 1, further comprising a plurality of fasteners for securing the mounting portion of the housing to the bearing housing through a plurality of fastener openings of the mounting portion.

Clause 3. The rotor lock assembly of clause 1, wherein the pin shaft engages the rotor lock plate via a through hole configured therethrough, the through hole defining an axis parallel to and offset from a main shaft of the rotor.

Clause 4. The rotor lock assembly of clause 3, further comprising an alignment system operably coupled to the pin shaft so as to align the pin shaft with the through hole of the rotor lock plate.

Clause 5. The rotor lock assembly of clause 1, wherein the at least one removable rotor lock comprises a first removable rotor lock and a second removable rotor lock.

Clause 6. The rotor lock assembly of clause 5, wherein the first removable rotor lock is coupled to a first quadrant of the bearing housing and the second removable rotor lock is coupled to a second, adjacent quadrant of the bearing housing.

Clause 7. The rotor lock assembly of clause 1, wherein the housing further comprises a bushing element positioned within the opening and a bushing securing mechanism oriented to engage a corresponding feature of the bushing element and secure the bushing element within the opening.

Clause 8. The rotor lock assembly of clause 7, wherein the pin shaft is movable within the bushing element via at least one of an axial movement or a rotational movement and wherein the pin shaft is moved by at least one of a direct-manual engagement system, a hydraulic engagement system, a geared engagement system or a motorized engagement system operably coupled to the pin shaft.

Clause 9. The rotor lock assembly of clause 1, wherein the proximal end of the pin shaft engages the locking mechanism.

Clause 10. The rotor lock assembly of clause 1, wherein the distal end of the pin shaft comprises a tapered cross-sectional profile.

Clause 11. The rotor lock assembly of clause 1, wherein the housing further comprises at least one attachment location for providing a lifting point for lifting the removable rotor lock uptower.

Clause 12. A method for performing a maintenance and/or repair procedure on a component of a wind turbine, the method comprising:
coupling at least one removable rotor lock to a main bearing housing;
preventing rotation of the rotor;
advancing a built-in low-speed rotor lock of the wind turbine so as to engage a first corresponding feature of a rotor lock plate;
advancing a pin shaft of the at least one removable rotor lock to an advanced position so as to engage a second corresponding feature of the rotor lock plate; and,
securing the pin shaft in the advanced position through the engagement of a locking mechanism.

Clause 13. The method of clause 12, further comprising:
aligning the pin shaft with the corresponding feature of the rotor lock plate via an alignment system operably coupled to the pin shaft.

Clause 14. The method of clause 12, wherein the advancing the pin shaft comprises advancing the pin shaft via at least one of a direct-manual engagement system, a hydraulic engagement system, a geared engagement system or a motorized engagement system operably coupled to the pin shaft.

Clause 15. The method of clause 12, wherein the at least one removable rotor lock comprises a first removable rotor lock coupled to a first quadrant of the bearing housing, the method further comprising:
coupling a second removable rotor lock to an adjacent quadrant of the main bearing housing.

Clause 16. The method of clause 12, further comprising:
performing the maintenance procedure on an assembled nacelle, up tower.

Clause 17. The method of clause 15, further comprising:
hoisting the first and second removable rotor locks through an access hatch located on an underside of the nacelle up tower.

Clause 18. A wind turbine repair system comprising:
a rotor lock plate circumferentially mounted to a rotor shaft of the wind turbine, the rotor lock plate defining a plurality of openings, each of the plurality of openings having an axis parallel to and offset from the rotor shaft;
a low-speed rotor lock coupled to a bedplate support frame perpendicular to the rotor lock plate;
a bearing housing; and,
a removable rotor lock mounted to the bearing housing, the removable rotor lock comprising:
a housing comprising an opening and a mounting portion, the opening extending from a first end to a second end thereof, the mounting portion adapted for mounting to a bearing housing adjacent to a rotor lock plate of the rotor,
a pin shaft positioned within the opening, the pin shaft comprising a proximal end and a distal end, the pin shaft being movable within the opening such that the distal end moves toward and engages the rotor lock plate of the rotor, and
a locking mechanism for locking the pin shaft in place.

Clause 19. The wind turbine repair system of clause 18, wherein the bearing housing further comprises a removable rotor lock mounting point, the removable rotor lock mounting point comprising:
a planar surface defining a plurality of fastener openings, the planar surface having a long axis oriented perpendicular to the rotor shaft,
a pair of mounting ridges oriented perpendicular to the rotor shaft with the planar surface disposed between the pair of mounting ridges.

Clause 20. The wind turbine repair system of clause 18, wherein the removable rotor lock comprises a first removable rotor lock and the rotor lock mounting point comprises a first rotor lock mounting point located within a first quadrant of the main bearing housing, the system further comprising:
a second removable rotor lock coupled to a second rotor lock mounting point located within a second quadrant of the main bearing housing.

What is claimed is:

1. A rotor lock assembly for locking a rotor of a wind turbine, the rotor lock assembly comprising:
at least one removable rotor lock, comprising:
a housing comprising an opening, a mounting portion, a bushing element, and a bushing securing mechanism, the bushing element positioned within the opening, the bushing securing mechanism oriented to engage a corresponding feature of the bushing element and to secure the bushing element within the opening, the opening extending from a first end to a second end of the housing, the mounting portion adapted for mounting to a bearing housing adjacent to a rotor lock plate of the rotor; and,
a pin shaft positioned within the opening, the pin shaft comprising a proximal end and a distal end, the pin shaft being movable within the opening such that the distal end moves toward and engages the rotor lock plate of the rotor; and,
a locking mechanism for locking the pin shaft in place.

2. The rotor lock assembly of claim 1, further comprising a plurality of fasteners for securing the mounting portion of the housing to the bearing housing through a plurality of fastener openings of the mounting portion.

3. The rotor lock assembly of claim 1, wherein the pin shaft engages the rotor lock plate via a through hole configured therethrough, the through hole defining an axis parallel to and offset from a main shaft of the rotor.

4. The rotor lock assembly of claim 1, wherein the at least one removable rotor lock comprises a first removable rotor lock and a second removable rotor lock.

5. The rotor lock assembly of claim 4, wherein the first removable rotor lock is coupled to a first quadrant of the bearing housing and the second removable rotor lock is coupled to a second, adjacent quadrant of the bearing housing.

6. The rotor lock assembly of claim 1, wherein the pin shaft is movable within the bushing element via at least one of an axial movement or a rotational movement and wherein the pin shaft is moved by at least one of a direct-manual engagement system, a hydraulic engagement system, a geared engagement system or a motorized engagement system operably coupled to the pin shaft.

7. The rotor lock assembly of claim 1, wherein the proximal end of the pin shaft engages the locking mechanism.

8. The rotor lock assembly of claim 1, wherein the distal end of the pin shaft comprises a tapered cross-sectional profile.

9. The rotor lock assembly of claim 1, wherein the housing further comprises at least one attachment location for providing a lifting point for lifting the removable rotor lock up tower.

10. A method for performing a maintenance or repair procedure on a component of a wind turbine, the method comprising:
coupling at least one removable rotor lock to a main bearing housing, the housing comprising an opening, a mounting portion, a bushing element, and a bushing securing mechanism, the bushing element positioned within the opening, the bushing securing mechanism oriented to engage a corresponding feature of the bushing element and to secure the bushing element within the opening, the opening extending from a first end to a second end of the housing, the mounting portion adapted for mounting to a bearing housing adjacent to a rotor lock plate of the rotor;
preventing rotation of the rotor;
advancing a built-in low-speed rotor lock of the wind turbine so as to engage a first corresponding feature of the rotor lock plate;
advancing a pin shaft of the at least one removable rotor lock to an advanced position so as to engage a second corresponding feature of the rotor lock plate; and,
securing the pin shaft in the advanced position through the engagement of a locking mechanism.

11. The method of claim 10, wherein the advancing the pin shaft comprises advancing the pin shaft via at least one of a direct-manual engagement system, a hydraulic engagement system, a geared engagement system or a motorized engagement system operably coupled to the pin shaft.

12. The method of claim 10, wherein the at least one removable rotor lock comprises a first removable rotor lock coupled to a first quadrant of the bearing housing, the method further comprising:
coupling a second removable rotor lock to an adjacent quadrant of the main bearing housing.

13. The method of claim 10, further comprising:
performing the maintenance procedure on an assembled nacelle, up tower.

14. The method of claim 12, further comprising:
hoisting the first and second removable rotor locks through an access hatch located on an underside of the nacelle up tower.

15. A wind turbine repair system comprising:
a rotor lock plate circumferentially mounted to a rotor shaft of the wind turbine, the rotor lock plate defining a plurality of openings, each of the plurality of openings having an axis parallel to and offset from the rotor shaft;
a low-speed rotor lock coupled to a bedplate support frame perpendicular to the rotor lock plate;
a bearing housing; and,
a removable rotor lock mounted to the bearing housing, the removable rotor lock comprising:
a housing comprising an opening, a mounting portion, a bushing element, and a bushing securing mechanism, the bushing element positioned within the opening, the bushing securing mechanism oriented to engage a corresponding feature of the bushing element and to secure the bushing element within the opening, the opening extending from a first end to a second end of the housing, the mounting portion adapted for mounting to the bearing housing adjacent to a rotor lock plate of the rotor; and,
a pin shaft positioned within the opening, the pin shaft comprising a proximal end and a distal end, the pin shaft being movable within the opening such that the distal end moves toward and engages the rotor lock plate of the rotor, and
a locking mechanism for locking the pin shaft in place.

16. The wind turbine repair system of claim 15, wherein the bearing housing further comprises a removable rotor lock mounting point, the removable rotor lock mounting point comprising:
a planar surface defining a plurality of fastener openings, the planar surface having a long axis oriented perpendicular to the rotor shaft,
a pair of mounting ridges oriented perpendicular to the rotor shaft with the planar surface disposed between the pair of mounting ridges.

17. The wind turbine repair system of claim 15, wherein the removable rotor lock comprises a first removable rotor lock and the rotor lock mounting point comprises a first rotor lock mounting point located within a first quadrant of the main bearing housing, the system further comprising:
a second removable rotor lock coupled to a second rotor lock mounting point located within a second quadrant of the main bearing housing.

* * * * *